United States Patent Office 3,287,217
Patented Nov. 22, 1966

3,287,217
COMPOSITIONS AND METHODS FOR STIMULATING THE CENTRAL NERVOUS SYSTEM AND INCREASING THE BLOOD PRESSURE
Ernst Seeger, Biberach an der Riss, Germany, assignor, by mesne assignments, to Boehringer Ingelheim G.m.b.H., Ingelheim (Rhine), Germany, a corporation of Germany
No Drawing. Filed May 10, 1963, Ser. No. 279,605
Claims priority, application Germany, Apr. 7, 1960, T 18,199
12 Claims. (Cl. 167—65)

This is a continuation-in-part of copending application Serial No. 97,437, filed March 22, 1961, now abandoned.

This invention relates to α-pyrrolidyl ketones and their non-toxic, pharmacologically acceptable acid addition salts, as well as to methods of preparing these novel compounds, and to pharmacodynamic compositions containing said ketones as active ingredients.

More particularly, the present invention relates to α-pyrrolidyl ketones of the formula

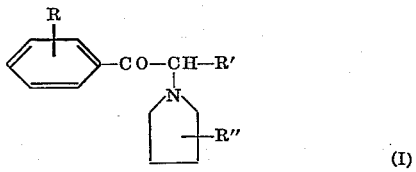

(I)

wherein

R is selected from the group consisting of hydrogen, lower alkyl, lower alkoxy, hydroxyl and halogen,
R' is selected from the group consisting of alkyl with 2–8 carbon atoms and alkenyl with 2–8 carbon atoms, and
R" is selected from the group consisting of hydrogen and lower alkyl, and their non-toxic, pharmacologically acceptable acid addition salts.

The α-pyrrolidyl ketones of the Formula I above may be prepared by a variety of methods, of which the following has been found to be most convenient:

By reacting an α-halo ketone of the formula

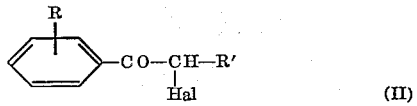

(II)

wherein Hal is halogen and R and R' have the meanings defined previously in connection with Formula I, with a pyrrolidine of the formula

(III)

wherein R" has the meanings previously defined in connection with Formula I. The reaction between compounds II and III is advantageously performed at room temperature or slightly elevated temperature in the presence of an inert organic solvent, such as benzene, toluene, ether, acetone, carbon tetrachloride, chloroform and the like, as well as in the presence of an organic or inorganic substance capable of neutralizing or tying up the hydrogen halide formed during the reaction, such as pyridine, quinoline, N-dialkyl-anilines, or alkali metal carbonates, such as sodium bicarbonate, potassium carbonate and the like. However, the pyrrolidine reactant itself may also be employed to serve as the hydrogen halide neutralizing agent; for this purpose the pyrrolidine compound of the Formula III is provided in the reaction mixture in an amount which is sufficient to make available not only the stoichiometric molar quantity for reaction with the α-halo ketone II but also the stoichiometric molar quantity for neutralization of the theoretical amount of hydrogen halide formed during the reaction.

The α-halo ketones of the Formula II which are used as starting materials in this method are either well-known compounds or may be prepared by known methods, such as by bromination of the corresponding ketones in glacial acetic acid according to Schmidt, Berichte der Deutschen Chemischen Gesellschaft, vol. 22, page 3251 (1889).

EXAMPLE I

Preparation of α-pyrrolidyl-valerophenone and acid addition salts thereof (a) A solution of 19.2 gm. of α-bromo-valerophenone (B.P.=115° C. at 1 mm. Hg) in 40 cc. of benzene was added dropwise at a temperature of about 40° C. of benzene. After all of the α-halo ketone solution had been added, the reaction mixture was stirred for 30 minutes more and was then allowed to stand for several hours. Thereafter, the benzene was distilled off in vacuo, and the residue was taken up in dilute hydrochloric acid. The acid solution was extracted twice by shaking with ether. The ether extract solutions were discarded. The aqueous acid solution was made alkaline with sodium hydroxide, whereby a precipitate formed. This precipitate was taken up in ether, the ether solution was dried over sodium sulfate, and then the ether was evaporated. The residue was distilled in vacuo, which yielded 18 gm. of raw α-pyrrolidyl-valerophenone of the formula

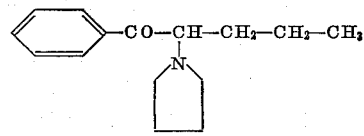

having a boiling point of 113° C. at 0.15 mm. Hg.

For transformation into the hydrochloric acid addition salt the raw α-pyrrolidyl-valerophenone was taken up in ether, and ethereal hydrochloric acid was added to the ether solution. The raw hydrochloride of α-pyrrolidyl-valerophenone precipitated out. It was recrystallized from acetone, whereupon it was obtained in the form of colorless crystals having a melting point of 162° C.

In analogous fashion the following other acid addition salts of α-pyrrolidyl-valerophenone were prepared:

(1) *Acid sulfate:* M.P. 140° C. (recrystallized from isopropanol).
(2) *Tartrate:* M.P. 148–149° C. (recrystallized from isopropanol).
(3) *Maleate:* M.P. 131° C. (recrystallized from acetone).
(4) *Citrate:* M.P. 88° C. with decomposition (recrystallized from acetone).

(b) A solution of 24 gm. of α-bromo-valerophenone in 50 cc. of carbon tetrachloride was added dropwise to 15 gm. of pyrrolidine, accompanied by stirring. During this dropwise addition of the α-halo-ketone solution the temperature of the reaction mixture was allowed to rise to 40° C., and after all of the solution had been added the reaction mixture was stirred for four hours more. The reaction mixture was then worked up as described under (a) above. The yield of α-pyrrolidyl-valerophenone was 20 gm. It had a boiling point of 116° C. at 0.2 mm. Hg.

(c) A solution of 24 gm. of α-bromo-valerophenone in 50 cc. of chloroform were added dropwise, accompanied by stirring, to a solution of 8 gm. pyrrolidine and 9 gm. of sodium bicarbonate in 25 cc. of chloroform.

After all of the α-halo ketone solution had been added, the reaction mixture was stirred for two hours more and was then allowed to stand overnight. Thereafter, the reaction mixture was worked up as described under (a) above. The yield of α-pyrrolidyl-valerophenone was 16 gm.

The same result was obtained when acetone was used as the solvent instead of chloroform.

(4) A solution of 4 gm. of pyrrolidine and 5 gm. of pyridine in 20 cc. of ether was allowed to flow slowly into a solution of 13 gm. of α-bromo-valerophenone in 30 ml. of ether, accompanied by constant stirring. After all of the pyrrolidine-pyridine solution had been added, the reaction mixture was stirred for two hours more and was then worked up as described under (a) above. The yield of α-pyrrolidyl-valerophenone was 7 gm.

EXAMPLE II

*Preparation of 1-(p-methyl-phenyl)-2-pyrrolidyl-pentanone-(1)*

A solution of 28.6 gm. of pyrrolidine in 100 cc. of benzene was added dropwise at a temperature of 35–40° C. to a solution of 25.6 gm. of 1-(p-methyl-phenyl)-2-bromo - pentanone - (1) - (boiling point=87–88° C. at 0.02 mm. Hg) in 80 ml. of benzene, accompanied by stirring. The resulting reaction mixture was then stirred for five hours more at room temperature, and it was then worked up as described in Example I (a). 20 gm. of the α-pyrrolidyl ketone of the formula

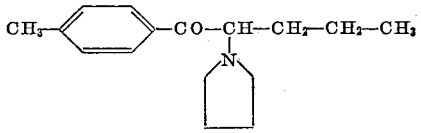

were obtained. The product had a boiling point of 104° C. at 0.08 mm. Hg.

The free base was converted into its hydrochloric acid addition salt by adding ethereal hydrochloric acid to a solution of the free base in ether. After recrystallization from methyl ethyl ketone, the hydrochloride had a melting point of 174–176° C.

EXAMPLE III

*Preparation of 1-phenyl-2-pyrrolidyl-3-methyl-butanone-(1)*

A solution of 35 gm. of pyrrolidine in 100 cc. of benzene was added dropwise at room temperature, accompanied by stirring, to a solution of 42 gm. of α-bromo-isovalero-phenone in 100 cc. of benzene. After all of the pyrrolidine solution had been added, the reaction mixture was heated for two hours at 35–40° C. and was then allowed to stand overnight at room temperature. Thereafter, it was worked up as described in Example I(a). 10 gm. of the α-pyrrolidyl ketone of the formula

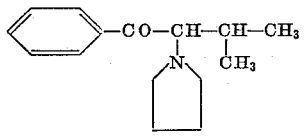

were obtained. It had a boiling point of 126° C. at 0.5 mm. Hg.

Its hydrochloride had a melting point of 225–226° C. after recrystallization from a mixture of acetone and ethanol.

EXAMPLE IV (a) *Preparation of 1-(p-methoxy-phenyl)-2-pyrrolidyl-pentanone-(1)*

20 gm. of 1-p-methoxy-phenyl)-2-bromopentanone-(1) (B.P.=156° C. at 0.8 mm. Hg) were reacted with 22.4 gm. of pyrrolidine by a procedure analogous to that described in the preceding example. 14 gm. of the α-pyrrolidyl ketone of the formula

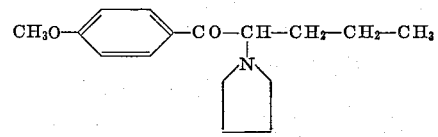

were obtained. It had a boiling point of 147° C. at 0.25 mm. Hg. Its hydrochloride had a melting point of 176–178° C. after recrystallization from methyl ethyl ketone.

(b) *Preparation of 1-(p-hydroxy-phenyl)-2-pyrrolidyl-pentanone-(1)*

5 gm. of the ketone obtained under (a) above were admixed with 15 cc. of glacial acetic acid and 10 cc. of 70% hydrogen iodide, and the resulting mixture was refluxed for one and a half hours. Thereafter, the reaction mixture was allowed to cool, water was added and the aqueous mixture was extracted by shaking with ether. The ether extract solution was discarded. The aqueous phase was made alkaline with ammonia, whereby a precipitate formed which was identified to be the α-pyrrolidyl ketone of the formula

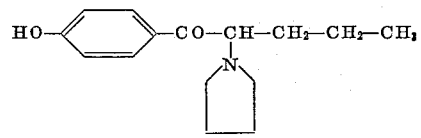

This product was dissolved in ether and the resulting solution was dried over sodium sulfate. Thereafter, ethereal hydrochloric acid was added, whereby the hydrochloride of the free base precipitated out. The hydrochloride was obtained as a colorless substance having a melting point of 250° C. after treatment with hot acetone. The yield was 2 gm.

EXAMPLE V

*Preparation of 1-phenyl-2-pyrrolidyl-butanone-(1)*

22.6 gm. of α-bromo-butyrophenone (B.P.=98° C. at 0.8 mm. Hg) were reacted with 28.4 gm. of pyrrolidine by a method analogous to that described in Example II. The yield was 15 gm. of the α-pyrrolidyl ketone of the formula

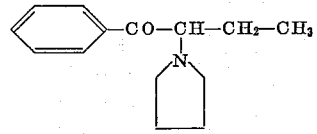

having a boiling point of 94° C. at 0.05 mm. Hg. Its hydrochloride had a melting point of 196–198° C. after recrystallization from methyl ethyl ketone.

EXAMPLE VI

*Preparation of 1-phenyl-2-pyrrolidyl-heptanone-(1)*

27 gm. of 1-phenyl-2-bromo-heptanone-(1) (B.P.=126–132° C. at 0.3 mm. Hg) were reacted with 14.2 gm. of pyrrolidine in benzene as a solvent, in a manner analogous to that described in Example II. The yield was 15 gm. of the α-pyrrolidyl ketone of the formula

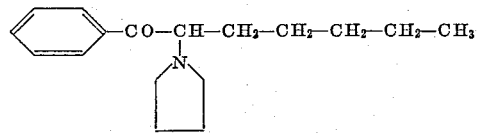

having a boiling point of 136–140° C. at 0.1 mm. Hg. Its hydrochloride, recrystallized from a mixture of acetone and ethanol, was obtained in the form of colorless crystals having a melting point of 158° C.

EXAMPLE VII

*Preparation of 1-(p-chloro-phenyl)-2-pyrrolidyl-pentanone-(1)*

Using a procedure analogous to that described in Example II, 27.5 gm. of 1-(p-chloro-phenyl)-2-bromo-pentanone-(1) (B.P.=114° C. at 0.2 mm. Hg) were reacted with 28.4 gm. of pyrrolidine, yielding 18 gm. of the α-pyrrolidyl ketone of the formula

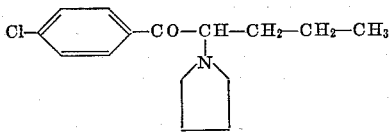

having a boiling point of 126–130° C. at 0.1 mm. Hg. Its hydrochloride was obtained in the form of colorless crystals having a melting opint of 205–207° C. after recrystallization from acetone.

EXAMPLE VIII

*Preparation of 1-(m-methyl-phenyl)-2-pyrrolidyl-pentanone-(1)*

Using a procedure analogous to that described in Example II, 12.5 gm. of 1-(m-methyl-phenyl)-2-bromo-pentanone-(1) (B.P.=112–115° C. at 0.2 mm. Hg) were reacted with 10.5 gm. of pyrrolidine, yielding 9 gm. of the α-pyrrolidyl ketone of the formula

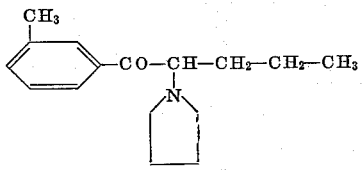

having a boiling point of 116–118° C. at 0.15 mm. Hg. Its hydrochloride was obtained in the form of a colorless crystalline substance having a melting point of 164° C. after recrystallization from acetone.

EXAMPLE IX

*Preparation of 1-phenyl-2-pyrrolidyl-nonanone-(1)*

28 gm. of pyrrolidine were added dropwise to a solution of 30 gm. of 1-phenyl-2-bromo-nonanone-(1) (B.P.=138–140° C. at 0.1 mm. Hg) in 100 cc. of benzene, accompanied by stirring. After all of the pyrrolidine had been added the reaction mixture was stirred for four hours at 40–50° C. The reaction mixture was then worked up as described in Example I(a). The yield was 17 gm. of the α-pyrrolidyl ketone of the formula

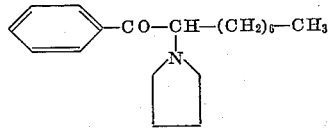

having a boiling point of 152° C. at 0.1 mm. Hg.

EXAMPLE X

*Preparation of α-pyrrolidyl-valerophenone*

10.6 gm. of pyrrolidine were added dropwise to a solution of 8.8 gm. of α-chloro-valerophenone in 20 cc. of benzene, accompanied by stirring. After all of the pyrrolidine had been added, the reaction mixture was stirred for one hour at 45° C. and was then allowed to stand overnight. The reaction mixture was then worked up as described in Example I(a). The yield was 4 gm. of the α-pyrrolidyl ketone of the formula

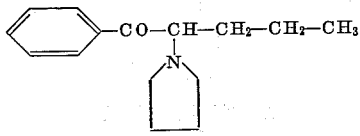

having a boiling point of 118° C. at 0.3 mm. Hg. Its hydrochloride had a melting point of 162° C. after recrystallization from acetone.

The α-chloro-valerophenone starting compound in the above procedure was obtained in the following manner: Chlorine was introduced for thirty minutes into a solution of 16.2 gm. of valerophenone in 150 cc. of carbon tetrachloride while exposing the solution to the light of a 1000-watt electric bulb. Thereafter, the reaction mixture was refluxed for forty minutes, the carbon tetrachloride was evaporated and the residue was distilled. 13 gm. of α-chloro-valerophenone were obtained in the form of a liquid having a boiling point of 126–128° C. at 12 mm. Hg.

EXAMPLE XI

*Preparation of 1-phenyl-2-pyrrolidyl-hexanone-(1)*

18.5 gm. of 1-phenyl-2-bromo-hexanone-(1) (B.P.=108° C. at 0.1 mm. Hg) were added dropwise to a solution of 11.5 gm. of pyrrolidine in 35 cc. of anhydrous benzene, accompanied by stirring. After all of the α-halo ketone had been added, the reaction mixture was stirred for three hours. Thereafter, the benzene was distilled off in vacuo and the residue was worked up as described in Example I(a). The yield was 12 gm. of the α-pyrrolidyl ketone of the formula

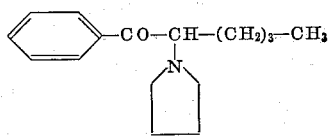

having a boiling point of 128–129° C. at 0.45 mm. Hg. Its hydrochloride is a colorless crystalline substance having a melting point of 139° C. after recrystallization from acetone.

EXAMPLE XII

*Preparation of α-(2'-methyl-pyrrolidyl)-valerophenone*

A solution of 9.6 gm. of α-bromo-valerophenone in 20 cc. of benzene was added dropwise to a solution of 7 gm. of 2-methyl-pyrrolidine in 30 cc. of benzene, accompanied by stirring. After all of the α-halo ketone solution had been added, the reaction mixture was stirred for four hours at 40° C. Thereafter, the reaction mixture was worked up as described in Example I(a). The yield was 7 gm. of the α-pyrrolidyl ketone of the formula

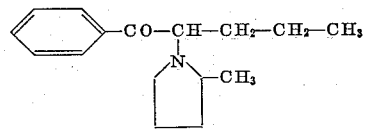

having a boiling point of 127–128° C. at 0.2 mm. Hg. Its colorless hydrochloride had a melting point of 133–134° C. after two recrystallizations, first from ethyl acetate and then from acetone.

The compounds embraced by Formula I and their non-toxic, pharmacologically acceptable acid addition salts are useful in that they exhibit excellent central nervous system stimulating, appetite curbing, as well as hypertensive activities, coupled with low toxicity. With respect to their stimulating effect upon the central nervous system the compounds of the present invention are anywhere from 10 to 40 times as effective as piperidyl ketones of analogous or related structure.

For therapeutic application the compounds according to the present invention are administered perorally or parenterally, preferably in the form of their non-toxic pharmacologically acceptable acid addition salts. Typical examples of such salts are the following: hydrochlorides, sulfates, phosphates, hydrobromides, methane sulfonates, tartarates, maleates, citrates, phthalates and the like.

The average single dose of the compounds, for example of 1-phenyl-2-pyrrolidyl-pentanone-(1) hydrochloride, which has been clinically tested, is 10–50 mg., preferably 20 mg. for adults. The average daily dose of the same compound is 20–100 mg., preferably 30 mg. for adults. For peroral and parenteral administration the compounds of the present invention are advantageously incorporated as active ingredients into dosage unit compositions, of which the following are illustrative examples. The parts are parts by weight unless otherwise specified.

EXAMPLE XIII

*Tablets.*—The tablets are compounded from the following ingredients:

| | Parts |
|---|---|
| 1 - phenyl - 2 - pyrrolidyl-pentanone-(1) hydrochloride | 20.0 |
| Lactose | 150.0 |
| Potato starch | 16.0 |
| Stearic acid | 4.0 |
| Corn starch | 20.0 |
| Talcum | 10.0 |
| Total | 220.0 |

*Compounding procedure.*—The 1-phenyl-2-pyrrolidyl-pentanone-(1) hydrochloride, the lactose and 13 parts of the potato starch are admixed with each other, and the resulting mixture is kneaded with a 10% aqueous musilage of the remainder of the potato starch and a 40% solution of the stearic acid in ethanol. The resulting moist composition is passed through a 1.0 mm.-mesh screen and is then dried at 40° C. The dry granulate obtained thereby is admixed with the remainder of the ingredients and the resulting mixture is pressed into tablets weighing 220 mgm. each. Each tablet contains 20 mgm. of active ingredient.

EXAMPLE XIV

*Coated pills.*—The pill core is compounded from the following ingredients:

| | Parts |
|---|---|
| 1 - phenyl - 2 - pyrroidyl - pentanone - (1) hydrochloride | 30.0 |
| Lactose | 140.0 |
| Potato starch | 16.0 |
| Stearic acid | 4.0 |
| Corn starch | 20.0 |
| Talcum | 10.0 |
| Total | 220.0 |

*Compounding procedure.*—The pillcore is formed in the same manner as the tablets in Example XIII. Thereafter, the pill cores, each weighing 220 mgm. and containing 30 mgm. of the active ingredient, are coated in the customary manner with a thin shell consisting essentially of talcum and sugar which is then polished with beeswax. Total weight of each coated pill: about 350 mgm.

EXAMPLE XV

*Ampules.*—The contents of the ampules are compounded from the following ingredients:

| | Parts |
|---|---|
| 1-phenyl - 2 - pyrrolidyl-pentanone-(1) hydrochloride | 10.0 |
| Sodium phosphate, sec. | 5.0 |
| Sodium chloride | 14.0 |
| Double-distilled water, q.s. ad (by vol.) | 2000.0 |

*Compounding procedure.*—The α-pyrrolidyl ketone salt, the sodium phosphate and the sodium chloride are dissolved, under an atmosphere of nitrogen, in a sufficient amount of the double-distilled water, and the resulting solution is then diluted with the remaining amount of water to the desired volume. The finished solution is filtered until free from suspended particles. It is finally filled into 2 ml. ampules in an atmosphere of nitrogen, which are sterilized for 30 minutes at 100° C. Each ampule contains 10 mgm. of active ingredient.

EXAMPLE XVI

*Drops.*—The drop solution is compounded from the following ingredients:

| | Parts |
|---|---|
| 1 - phenyl - 2 - pyrrolidyl-pentanone-(1) hydrochloride | 1.5 |
| Saccharin-sodium | 0.2 |
| Sugar | 20.0 |
| p-Hydroxy-benzoic acid methyl ester | 0.07 |
| p-Hydroxy-benzoic acid propyl ester | 0.03 |
| Orange flavoring | 0.5 |
| Ethanol, pure (by vol.) | 15.0 |
| Distilled water, q.s. ad (by vol.) | 100.0 |

*Compounding procedure.*—The α-pyrrolidyl ketone salt, the saccharin-sodium and the sugar are dissolved in a sufficient amount of distilled water (solution A). The p-hydroxy-benzoic acid esters and the orange flavoring are dissolved in the ethanol (solution B). Solution B is added, while stirring, to solution A and the resulting solution is diluted with distilled water to the desired volume. The finished solution is then filtered until clear. Each ml. of solution (about 15 drops) contains 15 mgm. of active ingredient.

While I have illustrated my invention with the aid of certain representative specific embodiments, it will be readily apparent to others skilled in the art that my invention is not limited to those embodiments. Thus, it is obvious that in Examples XIII through XVI any of the other compounds embraced by Formula I or their non-toxic acid addition salts may be substituted for the 1-phenyl-2-pyrrolidyl-pentanone-(1) hydrochloride and that the concentration of the active ingredient and the nature of the inert carriers in the illustrative dosage unit compositions may be varied to suit the particular requirements.

In addition, other changes and modifications may be made without departing from the spirit of the invention or the scope of the appended claims.

I claim:

1. A pharmacodynamic composition consisting essentially of 10–50 mgm. of a compound selected from the group consisting of α-pyrrolidyl ketones of the formula

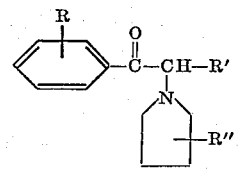

wherein

R is selected from the group consisting of hydrogen, methyl, methoxy, hydroxyl and chlorine, R' is alkyl of 2 to 4 carbon atoms, inclusive, and R'' is selected from the group consisting of hydrogen and methyl, and their non-toxic, pharmacologically acceptable acid addition salts, and a physiologically compatible inert carrier.

2. A pharmacodynamic composition consisting essentially of 10–50 mgm. of 1-phenyl-2-pyrrolidyl-pentanone-(1)-hydrochloride and an inert physiologically compatible carrier.

3. A pharmacodynamic composition consisting essentially of 10–50 mgm. of 1-(p-methyl-phenyl)-2-pyrrolidyl-pentanone-(1) and an inert physiologically compatible carrier.

4. A pharmacodynamic composition consisting essentially of 10–50 mgm. of 1-phenyl-2-pyrrolidyl-hexanone-(1) and an inert physiologically compatible carrier.

5. A pharmacodynamic composition consisting essentially of 10–50 mgm. of 1-(p-hydroxy-phenyl)-2-pyrrolidyl-pentanone-(1) and an inert physiologically compatible carrier.

6. A pharmacodynamic composition consisting essentially of 10–50 mgm. of 1-phenyl-2-pyrrolidyl-butanone-(1) and an inert physiologically compatible carrier.

7. The method of stimulating the central nervous system and increasing the blood pressure in humans, which comprises administering to said humans from 10 to 50 mgm. of a compound selected from the group consisting of α-pyrrolidyl ketones of the formula

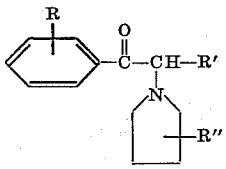

wherein

R is selected from the group consisting of hydrogen, methyl, methoxy, hydroxyl and chlorine,
R' is alkyl of 2 to 4 carbon atoms, inclusive, and
R" is selected from the group consisting of hydrogen and methyl, and their non-toxic, pharmacologically acceptable acid addition salts, and a physiologically compatible inert carrier.

8. The method of stimulating the central nervous system and increasing the blood pressure in humans, which comprises administering to said humans from 10 to 50 mgm. of 1-phenyl-2-pyrrolidyl-pentanone-(1).

9. The method of stimulating the central nervous system and increasing the blood pressure in humans, which comprises administering to said humans from 10 to 50 mgm. of 1-(p-methyl-phenyl)-2-pyrrolidyl-pentanone-(1).

10. The method of stimulating the central nervous system and increasing the blood pressure in humans, which comprises administering to said humans from 10 to 50 mgm. of 1-phenyl-2-pyrrolidyl-hexanone-(1).

11. The method of stimulating the central nervous system and increasing the blood pressure in humans, which comprises administering to said humans from 10 to 50 mgm. of 1-(p-hydroxy-phenyl)-2-pyrrolidyl-pentanone-(1).

12. The method of stimulating the central nervous system and increasing the blood pressure in humans, which comprises administering to said humans from 10 to 50 mgm. of 1-phenyl-2-pyrrolidyl-butanone-(1).

References Cited by the Examiner

UNITED STATES PATENTS

| | | | |
|---|---|---|---|
| 3,001,910 | 9/1961 | Schutte | 167—65 |
| 3,082,255 | 3/1963 | Stevens | 260—570.5 |

FOREIGN PATENTS

| | | |
|---|---|---|
| 765,544 | 1/1957 | Great Britain. |

JULIAN S. LEVITT, *Primary Examiner.*

PAUL SABATINE, NORRIS G. MANN, STANLEY J. FRIEDMAN, *Assistant Examiners.*